United States Patent
Pirovano

(10) Patent No.: US 8,956,088 B2
(45) Date of Patent: Feb. 17, 2015

(54) DRILLING DEVICE FOR DRILLING SIDE PORTIONS OF LARGE SECTION MEMBERS

(75) Inventor: Alessandro Pirovano, Varese (IT)

(73) Assignee: Ficep S.p.A., Gazzada Schianno (IT)

( * ) Notice: Subject to any disclaimer, the term of this patent is extended or adjusted under 35 U.S.C. 154(b) by 310 days.

(21) Appl. No.: 13/425,842

(22) Filed: Mar. 21, 2012

(65) Prior Publication Data

US 2013/0251470 A1 Sep. 26, 2013

(51) Int. Cl.
*B23B 39/16* (2006.01)

(52) U.S. Cl.
USPC ............ 408/42; 408/46; 408/88; 408/89; 408/237

(58) Field of Classification Search
CPC ...................................... B23B 39/16
USPC .......... 408/234, 236, 237, 42, 46, 49, 50, 52, 408/87–89
See application file for complete search history.

(56) References Cited

U.S. PATENT DOCUMENTS

| | | | | |
|---|---|---|---|---|
| 1,748,556 A | * | 2/1930 | McKnight | 408/88 |
| 1,835,539 A | * | 12/1931 | Thomas | 408/46 |
| 2,111,784 A | * | 3/1938 | Johnson | 451/155 |
| 3,276,329 A | * | 10/1966 | Saliba | 409/211 |
| 3,286,554 A | * | 11/1966 | Jodoin | 408/46 |
| 3,561,001 A | * | 2/1971 | Giuliani | 408/3 |
| 3,806,691 A | * | 4/1974 | Roach | 219/69.16 |
| 6,679,659 B1 | * | 1/2004 | Lasch et al. | 409/235 |
| 2005/0084354 A1 | * | 4/2005 | Feinauer et al. | 408/236 |

FOREIGN PATENT DOCUMENTS

JP   03-026408 A  *  2/1991  ............. B23B 39/16

* cited by examiner

*Primary Examiner* — Daniel Howell
*Assistant Examiner* — Ryan Rufo
(74) *Attorney, Agent, or Firm* — Kirschstein et al.

(57) ABSTRACT

A device for drilling side portions of large section members, the device being arranged in a cutting system for cutting individual section member lengths, starting from a long section member, comprises a base thereon swinging support arms extend, the support arms being arranged with a V pattern enclosing an angle ($\alpha$), each support arm including a plurality of sliding rollers for causing the section member to slide thereon, the swinging arms including guides slidably supporting a controllably driven carriage operatively connected to a threaded screw, each threaded screw being operatively connected to a controllable motor, each carriage having a movable arm which may be controllably displaced along guides and comprising parallel guides engaging a drilling assembly operatively coupled to a driving shaft, each driving shaft being operatively connected to a corresponding controllable motor.

4 Claims, 2 Drawing Sheets

DRILLING DEVICE FOR DRILLING SIDE PORTIONS OF LARGE SECTION MEMBERS

BACKGROUND OF THE INVENTION

The present invention relates to a drilling device for drilling side portions of large section members.

It is already known from prior art, to cut individual section member lengths by a band sawing machine, starting from a section member having a length of about 6 meters and more.

As it is also known, the single section member lengths are cut through a making cutting line, the individual section member lengths cut to a target measurement being then loaded in succession into a drilling machine.

Moreover, outside of the section member cutting line, other devices are also provided for performing beveling milling operations on the vertex region where the section member sides meet with one another.

It should be apparent that such a provision of further devices outside of the section member cutting line, represents a substantial drawback, since it is necessary to drive the section members being cut from the saw machine cutting line to another machine for drilling, for example, the section member side portions.

SUMMARY OF THE INVENTION

Thus, the aim of the present invention is to overcome the above mentioned drawbacks and provide a section member side drilling machine or device, which is adapted to drill, respectively mill, the section member side portions respectively at a section member vertex point and which machine may be fitted to different section member angles, for example 90° and 60° angles, while allowing the drilling tool axis to be always held perpendicular to a corresponding section member side and the section member vertex milling tool to be held at the section member vertex.

The above aim is achieved by a drilling device for drilling side portions of large section members, the device being arranged in a cutting system for cutting individual section member lengths, starting from a long section member, said device comprising a base thereon swinging support arms extend, the support arms being arranged with a V pattern, enclosing an angle α, each support arm including a plurality of sliding rollers for causing the section member to slide thereon, the swinging arms including guides slidably supporting a controllably driven carriage operatively connected to a threaded screw, each threaded screw being operatively connected to a controllable motor, each carriage having a movable arm which may be controllably displaced along guides and comprising parallel guides engaging a drilling assembly, each drilling assembly being operatively coupled to a driving shaft, each driving shaft being operatively connected to a corresponding controllable motor.

BRIEF DESCRIPTION OF THE DRAWINGS

Further advantages and characteristics of the present invention will become more apparent hereinafter from the following disclosure, claims and accompanying drawings.

The subject matter according to the present invention will be disclosed in a more detailed manner hereinafter with reference to the accompanying drawings, where.

DESCRIPTION OF THE PREFERRED EMBODIMENT

Figure 1:
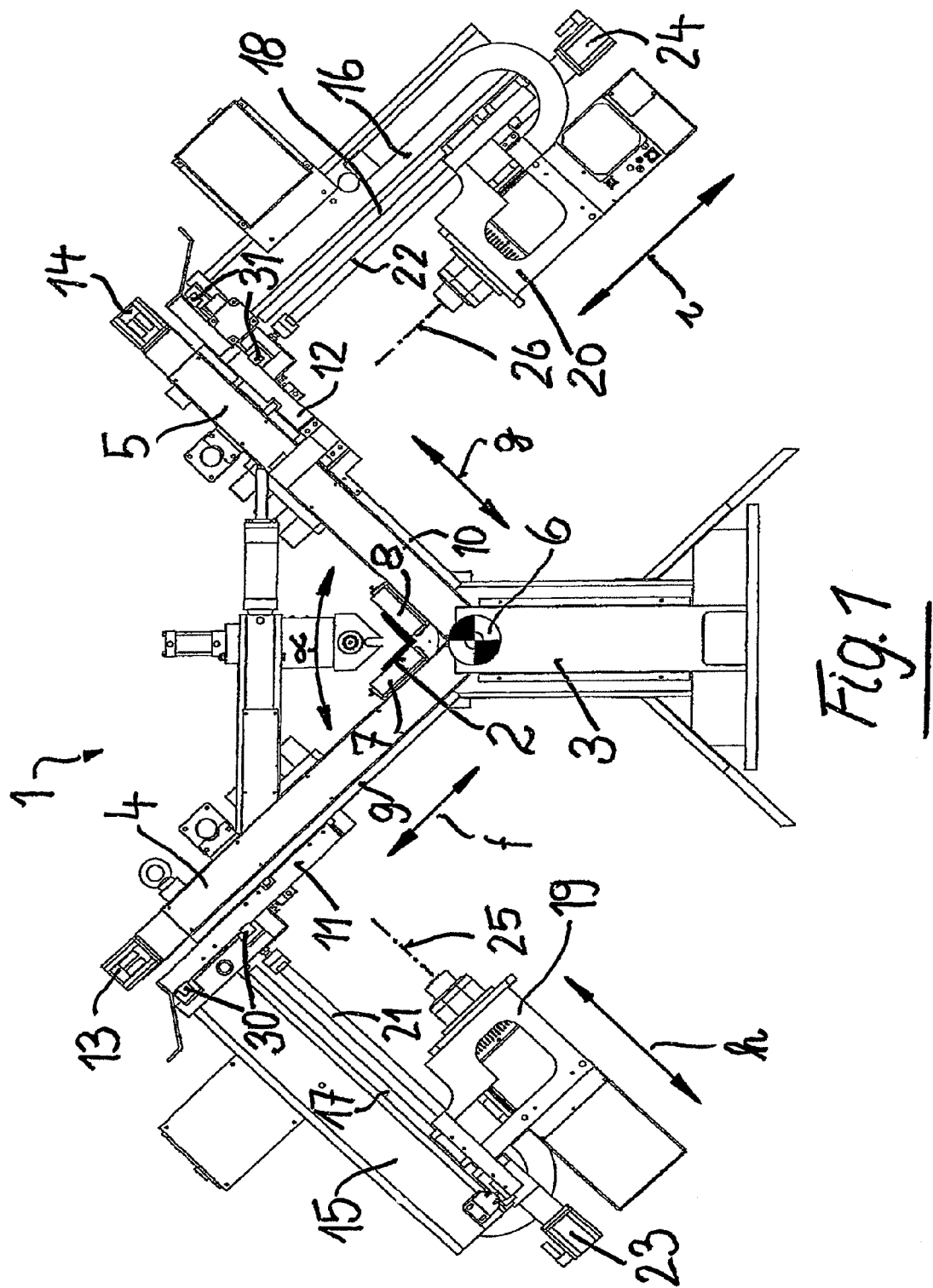
FIG. 1 is a front view of the section member drilling device.
Figure 2:
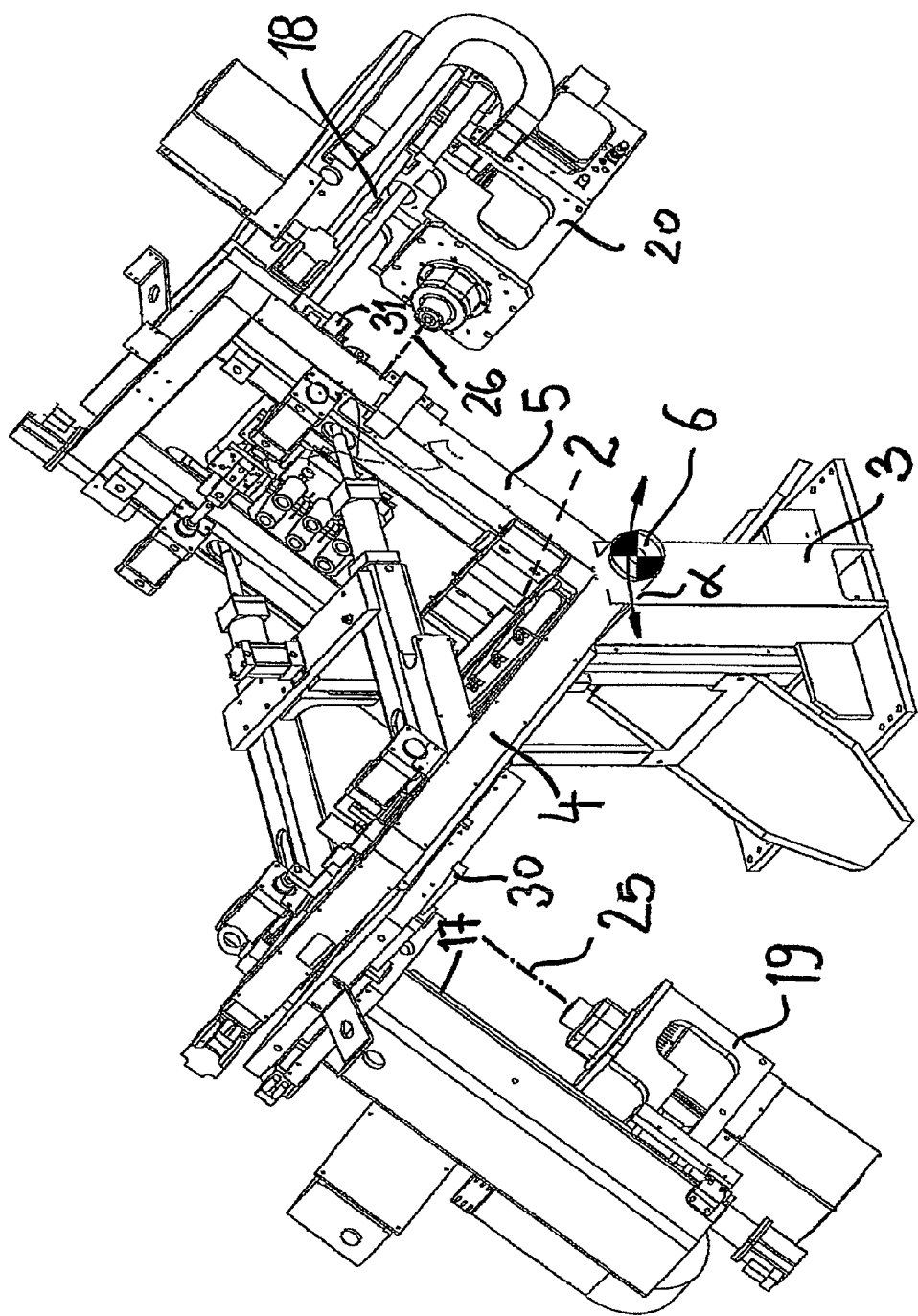
FIG. 2 is a perspective view of the drilling device shown in FIG. 1.

With reference to FIG. 1 the device, being generally indicated by the reference number 1 and arranged in a section member cutting line 2, comprises a base 3, therefrom swinging support arms 4 and 5 extend, said support arms having an adjustable angular position and defining an angle α therebetween, as shown in FIG. 1.

At the vertex 6, the arms 4 and 5 comprise a plurality of sliding rollers 7 and 8 for facilitating the movement of the section member 2.

The outer side of each arms 4, 5 supports precision guides 9 and 10 allowing a corresponding carriage 11, respectively 12, to controllably slide therealong, as shown by the arrows (f) and (g).

To that end the carriages 11 and 12 are operatively connected to the shaft of a controllable driving motor 13, respectively 14, each said motor 13 and 14 being arranged at the free end portion of the arms 4, 5 and is operatively connected to the system control assembly.

From each carriage or slide 11, 12, extends perpendicularly an arm 15, 16 including parallel guides 17 and 18, therealong a drilling assembly 19, 20, is slidably controllably driven in the direction of the arrows (h) and (i).

The drilling assemblies 19 and 20 are operatively connected to a corresponding driving threaded shaft 21 and 22, in turn operatively connected to shaft driving controllable motors 23, 24, which are controlled, for example, by encoder means of a per se known type, which are in turn operatively connected to the system control means.

Each drilling assembly 19, 20 supports a machining tool 25, 26 schematically indicated by a dot and dash line.

Advantageously, the arm 15, respectively 16, is slidably driven along guides 30, respectively 31, forming a complementary axis parallel to the section member driving axis for performing machining operations on a target area of the section member 2 without any need of relocating said section member 2.

The invention claimed is:

1. In a system for cutting elongated section members having side portions arranged in a V-shaped configuration into predetermined lengths, a device for drilling the V-shaped side portions of each cut section member, the device comprising:
   a base;
   a pair of elongated support arms pivotably mounted on, and extending in opposite directions away from, the base, the support arms being adjustable to bound an angle between the support arms that matches the V-shaped configuration of the side portions;
   a plurality of sliding rollers mounted on each support arm to support each cut section member for sliding movement in a longitudinal direction lengthwise of each cut section member;
   a pair of elongated carriage guides mounted on, and extending lengthwise of, each support arm;
   a pair of carriages mounted on the carriage guides on each support arm for guided movement lengthwise of each support arm;
   a pair of elongated tool guides mounted on each carriage, and extending generally parallel to the longitudinal direction;

a pair of drilling assemblies mounted on the tool guides on each carriage for guided movement generally parallel to the longitudinal direction; and a drive for moving each drilling assembly in a transverse direction generally perpendicular to the longitudinal direction into drilling engagement with the side portions of each cut section member.

2. The device according to claim 1, further comprising a pair of carriage motors at end regions of the support arms for moving the carriages lengthwise of each support arm.

3. The device according to claim 1, further comprising a pair of tool motors on each carriage for moving the drilling assemblies in the longitudinal direction.

4. The device according to claim 1, wherein the angle between the support arms is 90 degrees.

\* \* \* \* \*